US008074787B2

(12) United States Patent
Grilli (10) Patent No.: US 8,074,787 B2
(45) Date of Patent: Dec. 13, 2011

(54) CONTAINER TRACK FOR CONTAINER TRANSPORT (76) Inventor: Silvio Grilli, Mondercange (LU)

( * ) Notice: Subject to any disclaimer, the term of this patent is extended or adjusted under 35 U.S.C. 154(b) by 335 days.

(21) Appl. No.: 12/162,453

(22) PCT Filed: Jan. 19, 2007

(86) PCT No.: PCT/EP2007/050556
§ 371 (c)(1),
(2), (4) Date: Jul. 28, 2008

(87) PCT Pub. No.: WO2007/085571
PCT Pub. Date: Aug. 2, 2007

(65) Prior Publication Data
US 2009/0014276 A1 Jan. 15, 2009

(30) Foreign Application Priority Data
Jan. 30, 2006 (EP) .................................. 06101006

(51) Int. Cl.
B65G 13/11 (2006.01)
B65B 13/12 (2006.01)

(52) U.S. Cl. .............. 198/781.05; 198/860.1; 198/860.3
(58) Field of Classification Search ............ 198/781.05, 198/860.1, 860.3
See application file for complete search history.

(56) References Cited

U.S. PATENT DOCUMENTS

| 5,348,137 | A  | * | 9/1994 | Palmer .......................... 198/643 |
| RE35,266 | E  | * | 6/1996 | Crafton et al. ................ 198/643 |
| 5,979,636 | A  | * | 11/1999 | Vanacore et al. .......... 198/460.1 |
| 6,098,789 | A  | * | 8/2000 | Ernst .............................. 198/809 |
| 6,370,447 | B1 | * | 4/2002 | Miyazaki ...................... 700/230 |
| 6,588,583 | B2 | * | 7/2003 | Trieb ............................. 198/845 |
| 6,820,736 | B2 | * | 11/2004 | Itoh et al. .................. 198/781.01 |
| 6,860,381 | B2 | * | 3/2005 | Newsom et al. ........... 198/781.05 |
| 7,104,395 | B2 | * | 9/2006 | Brown et al. ............. 198/781.06 |
| 7,178,659 | B2 | * | 2/2007 | Evans et al. ............. 198/370.09 |
| 7,243,781 | B2 | * | 7/2007 | Taylor ............................ 198/783 |
| 7,290,649 | B2 | * | 11/2007 | Wolkerstorfer .......... 198/781.05 |
| 7,542,823 | B2 | * | 6/2009 | Nagai ............................ 700/230 |
| 7,591,365 | B2 | * | 9/2009 | Knepple et al. ............ 198/460.1 |
| 7,673,737 | B2 | * | 3/2010 | Swoboda ...................... 198/780 |
| 7,681,326 | B2 | * | 3/2010 | Sugawara et al. ................ 34/93 |

* cited by examiner

Primary Examiner — Douglas Hess
(74) Attorney, Agent, or Firm — James E. Walton; Richard G. Eldredge (57) ABSTRACT The invention relates to a method for the transport of containers, wherein at least one container is driven along on rotating drive units (12) on a transport system, the transport system being built over a long distance such that remote delivery of containers may at least be achieved on a regional scale and a transport system for transporting containers comprising a rectangular frame (1,3), several rotatable drive units (12), fixed to the frame (1,3) perpendicular to the frame (1,3) and parallel to each other, each comprising at least one drive wheel (10) on which a container can be supported and driven, wherein the transport device runs over a long distance such that the remote delivery of containers may at least be achieved on a regional scale.

10 Claims, 8 Drawing Sheets

CONTAINER TRACK FOR CONTAINER TRANSPORT

TECHNICAL FIELD

The present invention relates to the transport of goods, especially to a method and an apparatus for the transport of containers.

STATE OF THE ART

Europe keeps growing and growing. Therefore the transport of goods grows as well in an immense way. Thus, new options for transport are searched and indeed many plans and propositions for solving this difficult problem exist up to now. The present state of the transport of goods on European motorways has reached a dead end. The motorways cannot be broadened till infinity, further the broadening costs a vast amount of money. But by the latter the problem would not be solved, thus, it is indeed necessary to search for other methods. Here we have involved ourselves with the following three considerations:
  1) Due to the need of application of environment-friendly energy instead of the immense amount of diesel fuel for the transport of goods on the motorways.
  2) For removing the increasingly problematic, heavy juggernauts as much as possibility from the motorways.
  3) For bringing the goods safe, much quicker and cheaper to their destination with less impact on the environment.

THE INVENTION

The technical problem of the present invention is to render a solution for the above mentioned problems.

The invention consists of a method for the transport of containers in accordance with the claims as well as a conveying system in accordance with the claims.

The container track has been invented for removing the more and more problematic juggernauts from the motorways as much as possible. The invention shall render an unproblematic, safe and quick transport of goods, just by utilizing containers.

The whole idea is based on a new construction which can be built either above a motorway or independently above new terrain. If it is built on new terrain, then the track can be guided as advantageous as possible because the latter has yet to be arranged, in contrast to the motorways. The construction consists of a roofed line provided with side walls (hall-like) in which the track is positioned, which can be mounted on a concrete base as well as on a steel base. If it is built above a motorway it is logically built upon supporting stands such that juggernauts and busses on the motorway below the track are still able to drive. In other cases it can be built on such pillars in a similar manner, just dependent on the certain needs and possibilities or it can be built very simple with its supporting surface right on the earth's surface.

The container track is a new form of transport for containers. It consists of a construction with wheels (rolls) on which the containers are moved instead of being moved on juggernauts. Its complete length can be housed in a kind of hall which is wholly covered with solar cells on the roof and on the side walls and thus can satisfy the power requirements independently. At the same time the container track would be isolated from outer influences as e.g.: the weather or unauthorized people. For the power supply of the container's cooling aggregates, they are optionally provided with liftable current collectors (or the like) by e.g. obtaining power from the power supply line. The latter can be positioned in such a height below the roof which enables at least to transport "High-Cube"-containers (with a height of 2.90 m). Nevertheless, this line can be positioned elsewhere, as e.g. sideward. If the solar cells produce excess power, then this can be fed in the public network or be extracted again if needed. The transport can be performed nonstop from start to destination, in daytime and at night, without considering holidays or the weather. If the containers have reached their destination, the containers are brought e.g. via streets to the client and vice versa, from the client to the container track. Due to the covering, all rain can be collected and since it is not polluted and free of de-icing salt, it can be fed in the public water supply. The transport of goods with juggernauts should be transferred to the container track, at first on long distances (and later, just as needed, on shorter distances) and should disappear on the motorways as far as possible.

Instead of constructing the container track above a motorway, it would be possible to conduct it alone overland. This has the disadvantage of the use of additional land for consequence. Since it can be conducted on unused waste land, the advantages would generously outbalance this, because it could be conducted more straight in contrast to the motorway and therefore be shorter. Since it does not need to fear adequate inclines, or declines, or thunderstorms it can almost go up and down any mountain or mountain chains or can circumnavigate at the hillside and therefore needs less tunnels or high bridges. The construction work would be simpler in this case.

EMBODIMENTS OF THE INVENTIONS

The principle of the "container track"

The container track consists of two aligned lanes which take course in one direction and two further lanes which take course in the opposite direction, parallel to the first two lanes, as well as to the motorway. These double-lines do only serve for the transport of containers. Since the left lane of each double-line (in direction of motion) is on the outer side of the container track, this lane would be suited best as driving lane, driveway, and gateway. In this case, the right lane is only provided as passing lane or avoiding lane, e.g. if needed for possible extensive repairs. The maintenance crews can use these areas by the median strip and the avoiding strip along the container track. Besides the outer lanes workshops are built and for avoiding long range transport of spare parts, spare part warehouses are positioned in suitable distances.

How does the "container track" work?

The transport of containers is turned upside down by the container track.

This means: Up to now, containers have been transported by a trailer on the wheels of a truck and with an own motor whereas the wheels ran over the street. At first the containers are put on platforms on which they are fastened by twist-locks and are driven on rotatable wheels (rolls) and thus we have, as mentioned before turned the principle upside down. Hence, new containers, and in the course of time also the already existing, usable ones should be bit by bit supplied with treads and guiding shoulders and then the platforms can again be bit by bit withdrawn. Lateral guide rolls allow for an guidance of the containers. The needless surplus weight of the truck had to be carried everywhere at any time which results in a waste of material (wear) and most of all, of fuel. In contrast, the container track is a community means of transport, nevertheless every single container heads checkless for its destination. With the container track only the container is transported without the need of fuel, but with the self-produced electric power or power taken from the net (if needed). The wear is naturally caused by the mechanical, electric, and electronic devices, but keeps within a limit since replacement elements are amongst others standardized and are not exposed to the weather. Furthermore the down times of the juggernauts being repaired or maintained are cancelled. By the standardization the maintenance is simplified since the same parts are replaced every time which are already available in reconditioned (maintained) form in the warehouse waiting for their application (exchange) with only some handholds. Our main aim is to obtain a most unrestricted, continuous flow of material. This is one of the most important tasks of the container track and further with a maximum level of security. Therefore the transport lanes (transport lines) have to be totally deserted and should be only entered by the maintenance crews in case of accidents or repairs, whereas the transport of this lane section keeps on moving on the other lane. Every drive wheel exhibits its own electric motor and forms thus a single drive unit. These drive units are arranged such that if one or more drive units fail, there are enough intact drive units under the smallest container for ensuring the transportation. The defective drive unit or units are quickly removed and are replaced by other already available units which have been maintained in the workshop. These and all other maintenance works can be performed without a problem, whereas the container transport is conducted undisturbed on the second lane.

The drive train of the "container track"

The drive units of the container track are provided (as mentioned in the above text) such that if one or more drive units fail at the same time, sufficient functioning drive units still rest below the smallest container for ensuring transport. The drive units are only activated if required. If no container is approaching the drive units are stopped. If a container approaches a drive unit within a certain distance, then the latter is activated to be in motion when the container reaches the drive unit. When the container has passed the drive unit with its end then it is disabled and waits for the next activation command. Then the next drive unit and so on. If the containers are approaching close enough to each other, then the drive units keep on moving non-stop. Since the whole transportation is computer controlled the switches are moved automatically. The container can be identified at any time and is protected from the environment and can be tracked during its whole ride.

The structure of the "container track"

If the container track is built above the motorway the latter is not affected and remains fully functional. Later it can be assessed whether sometimes cost can be saved if the motorway is built back instead of the expensively broadening of the motorway due to the increase of the juggernauts, as demanded frequently nowadays. The container track is intended for taking as much freight as possible of the motorway and the container track is able to render this possible since the containers can move back-to-back like railway cars but without being connected to each other. The median strip and the verge of the motorway can be used for planting the pillars of the container track such that no additional surface is needed, with exception of areas where it is not possible to pass over the motorway, as for example at tunnels or bridges. In the case of tunnels, the container track can pass over or circumnavigate, and in the case of a bridge it can lead down into the valley and up on the other side for joining again the motorway. The pillars and the support structure can be provided, if needed, in form of steel (steel joists, steel plates etc.) or of ferroconcrete or of other suitable materials. The pillars which starts to grow on the ground on both sides and on the median strip of the motorway, lead upwards until they join e.g. by a certain inclination at the upper end. Such they form a solid unit and by connecting these units with each other they serve as support for the roof and the side walls. The roof and the whole lateral surfaces (as far as possible or desired) are covered with hall-plates on which solar cells can be mounted. At each focal point which has to be supplied with containers, container gateways are provided with adjacent pick up, unloading, and loading places. From this place the containers are brought to and from the client. Each gateway is supplied with an x-ray system (as at ship-container harbors) whereas each container has to pass this system as a measure of precaution and for the control of goods before its journey.

Figure 1:
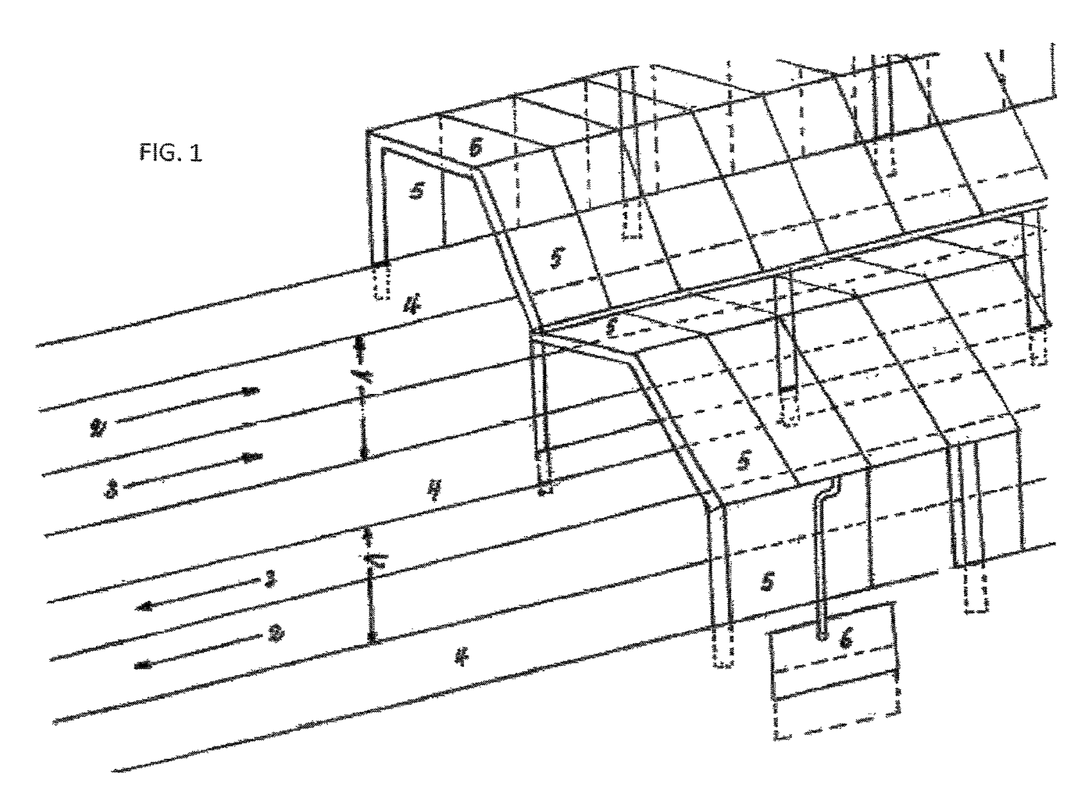
FIG. 1 shows a preferred arrangement of the container track.
Figure 2:
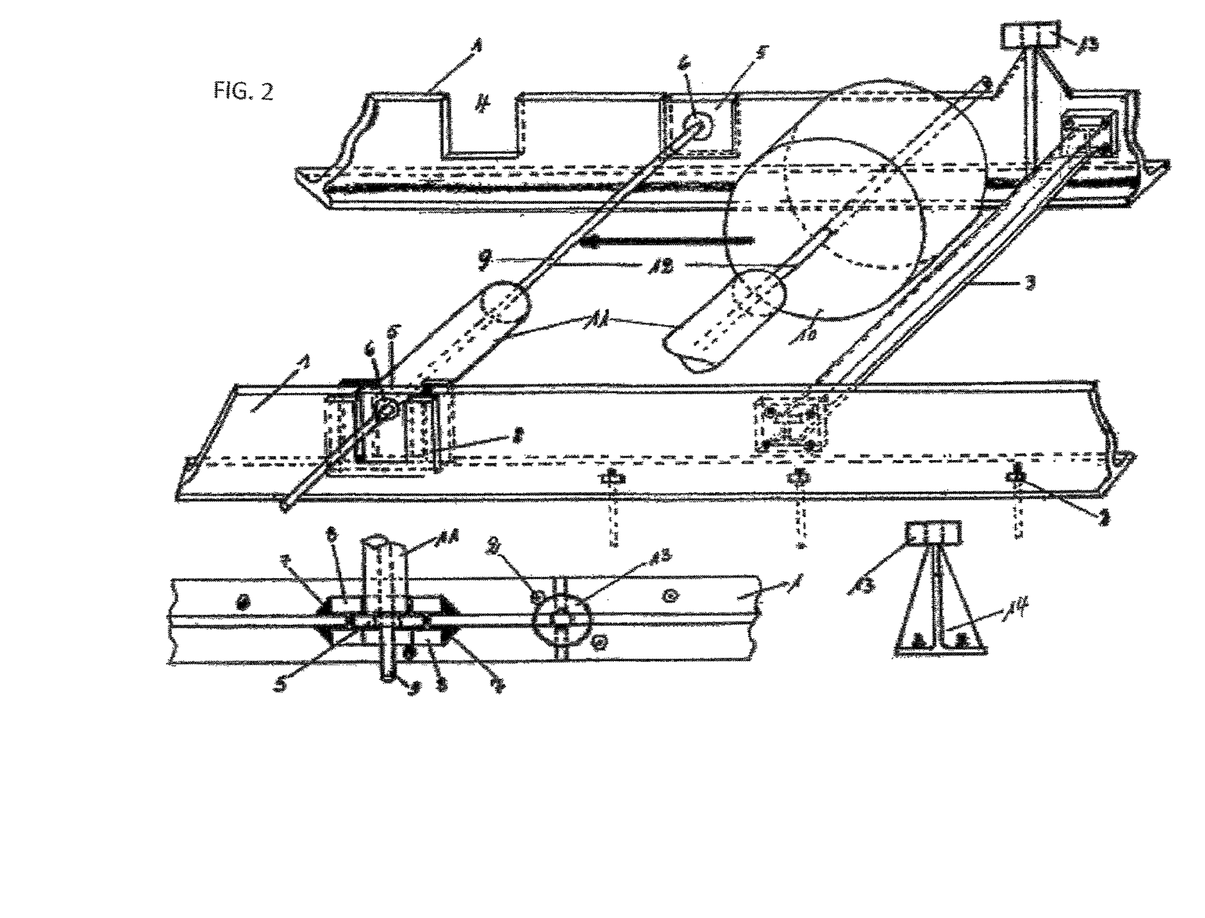
FIG. 2 shows construction details of the container track.
Figure 2A:
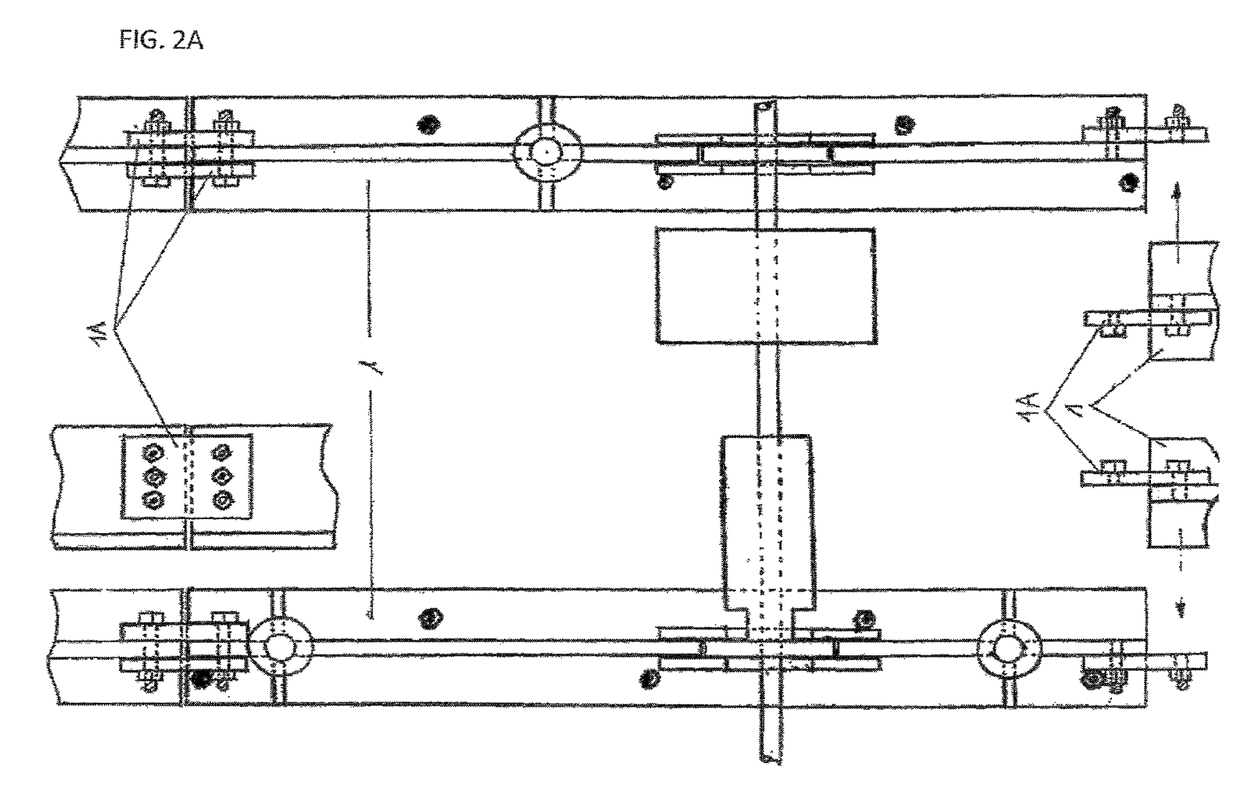
FIG. 2A is a topview of a part of the container track.
Figure 3:
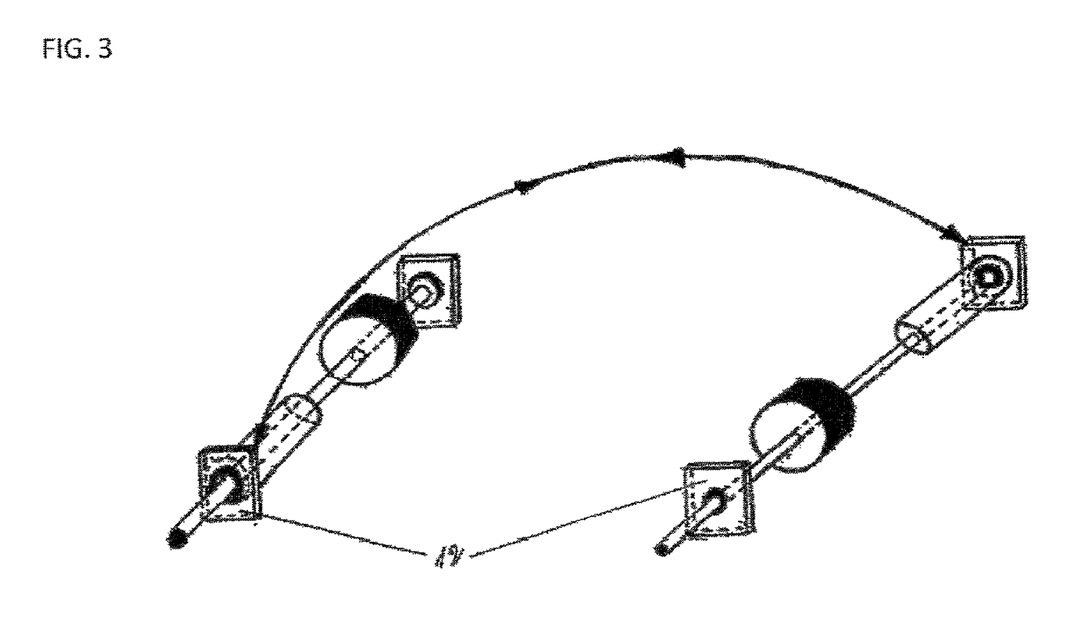
FIG. 3 shows two drive units and shows how they can be replaced.
Figure 4:
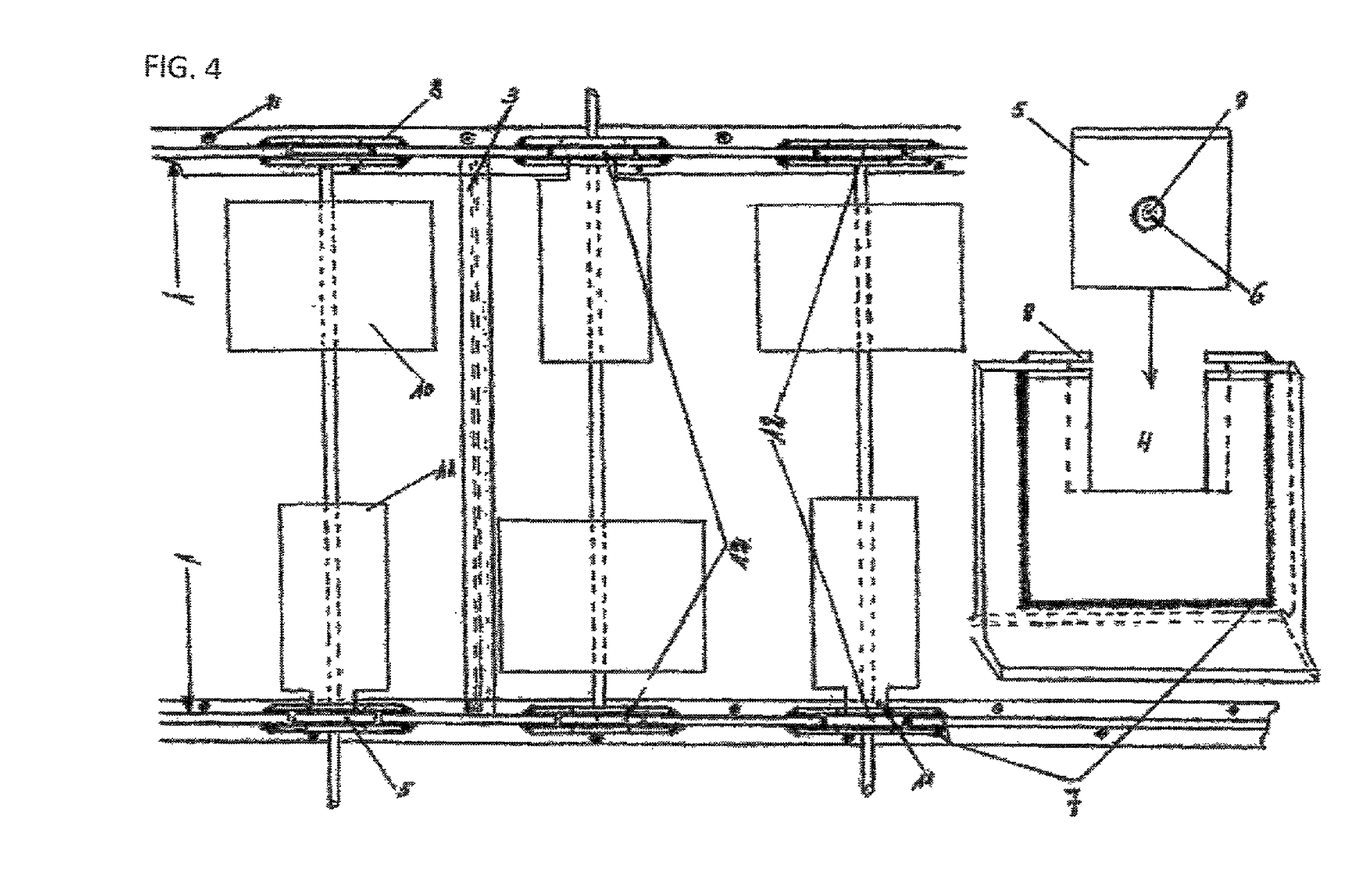
FIG. 4 shows how the drive units are fixed to the frame of the container track.
Figure 5:
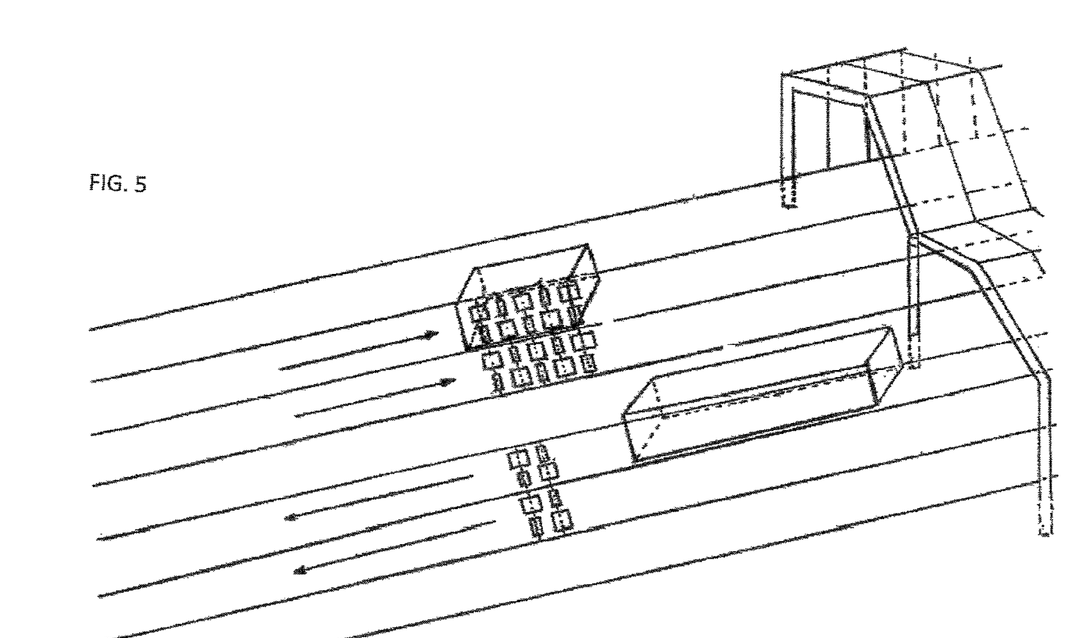
FIG. 5 shows the principle of the container track's function.
Figure 6:
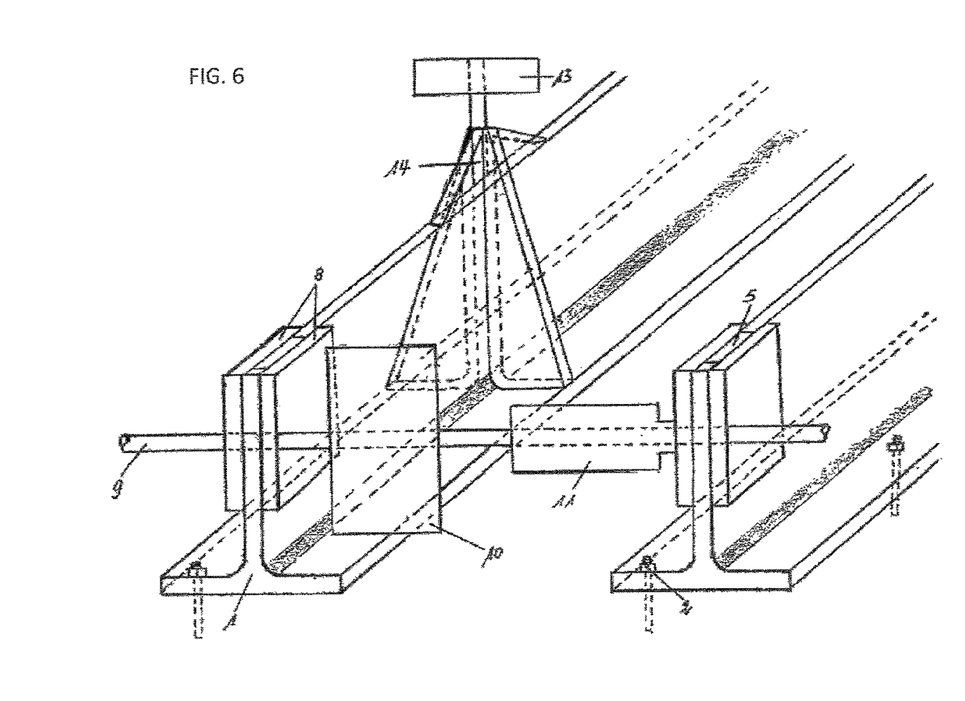
FIG. 6 shows further details of the container track.
Figure 7:
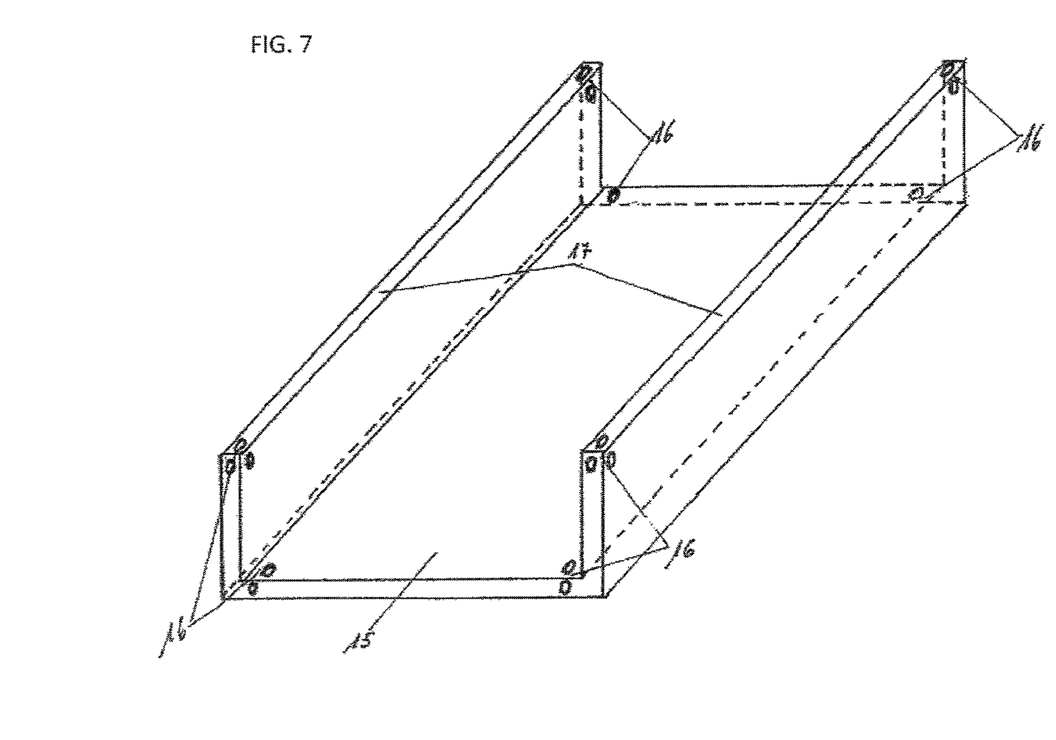
FIG. 7 shows a platform on which the container is transported.

FIG. 1

The container track consists of two double-lines 1 similar to the motorway. They are oppositely directed. On each double-line is provided a driving lane 2 and a passing lane 3. Instead of the median strip and the two verges of the motorway, maintenance tracks 4 are provided at the container track. Whereas the outer maintenance tracks 4 serve for caring for the outer driving lanes 2, the median lane is intended for the care of the passing lanes 3. On the roof as well as at the side walls solar cells 5 are attached, from which the container track obtains electric power. The rain water is for instance collected in subterranean collecting vessels 6, which are frequently positioned beside the track. The rainwater is transmitted elsewhere or directly supplies the public water supply.

FIGS. 2-7

The container track consists of two T-shaped (or similar) parallel aligned and connected steel joist lines 1, consisting of single segments which are connected via connection plates 1A (FIG. 2A), which are mounted on the support by means of anchoring screws 2 and are connected with each other by exchangeable spacers 3 (being not rigid, for the exchange of both). In the steel joist cutouts 4 for insertion plates 5 with bearings 6 which are hold in position by the mounting plates 8, being welded (or fixed in another way) with the steel joists (see weld seam 7). An axle 9 runs through the bearings on which a drive wheel 10 and an electric motor 11 are mounted. The electric motor 11 is fastened to the proximal insertion plate 5. Thus, a compact drive unit 12 is provided, which can be inserted on the left side as well as on the right side in the cutouts (see also FIG. 3). On the steel joists guide rolls 13 are attached for the guidance of the containers which are attached to the mountings 14. The platforms 15 are provided on the drive wheels 10 driven by the electric motors 11 (FIG. 7), on which are provided the containers being fastened to the corner-castings 16 via twist locks (FIG. 7) and are moved by the drive wheels. The guide rolls 14 run on the side walls 17 of the platforms 15 for the purpose of guidance. The platforms exhibit the length complying with the TEU standard (20 feet containers) and are provided with 8 corner-castings 16 for attaching two platforms to each other for even being able to transport the FEU (40 feet containers) and to affix the containers to the latter. The drive units 12 are positioned in such distances that even in case of a malfunction of one or more drive units at the same time, enough drive units remain to guarantee the transport of the smallest containers (see FIGS. 4 and 5).

Explanation of the reference signs in the figures.

FIG. 1:

1. Double-line
2. Driving lane
3. Passing lane
4. Maintenance lane
5. Solar cells
6. Collecting vessel

FIGS. 2-7:

1. T-shaped steel joists
1A. Connection plates
2. Anchoring screws
3. Spacers
4. Cutouts
5. Insertion plates with bearings
6. Bearing
7. Weld seam
8. Welded mounting plates
9. Axle
10. Drive wheel
11. Electric motor fastened to the inner side of the insertion plate
12. Drive unit, exchangeable on both sides
13. Guide rolls
14. Guide roll mountings
15. Platform
16. Mountings (corner-castings)
17. Side walls being contact surface for the guide rolls

The invention claimed is:

1. A conveying system for the transport of worldwide common transport containers, the conveying system comprising:
   an elongated frame comprising a first lane directed in a first direction and a second lane directed in an opposite second direction;
   multiple rotatable drive units mounted in parallel and crosswise to the frame, each drive unit providing at least one drive wheel for driving a transport container;
   cutouts in opposing steel joist lines;
   insertion plates configured to fit in the cutouts;
   bearings operably associated with each drive unit;
   a control system;
   a first drive unit operably associated with the first lane, the first drive unit being activated by the control system by a first transport container approaching the first lane and being disabled by the control system as the first transport container departs the first lane; and
   a second drive unit operably associated with the second lane, the second drive unit being activated by the control system by a second transport container approaching the second lane and being disabled by the control system as the second transport container departs the second lane;
   wherein the bearings are carried by the insertion plates; and
   wherein the conveying system is provided on at least a regional scale for enabling long distance conveyance of the transport containers.

2. The conveying system according to claim 1, further comprising:
   a cover having side walls.

3. The conveying system according to claim 1, wherein the frame comprises:
   a plurality of T-shaped support lines;
   connectors for connecting the T-shaped support lines; and
   a plurality of spacers for maintaining a selected space between the connected T-shaped support lines.

4. The conveying system according to claim 1, wherein each drive unit comprises:
   an axle; and
   at least one motor for driving the axle;
   wherein the drive wheel is operably associated with the axle.

5. The conveying system according to claim 1, wherein the drive units are reversible, such that the transport containers may be driven in either of two directions.

6. The conveying system according to claim 1, further comprising: a solar energy system for powering the drive units.

7. The conveying system according to claim 1, wherein the frame comprises:
   at least one maintenance lane.

8. A method for conveying worldwide common transport containers on at least a regional scale, comprising:
   providing an elongated frame, wherein the frame comprises a first lane directed in a first direction and a second lane directed in an opposite second direction;
   mounting a plurality of rotatable drive units in parallel and crosswise to the frame, each drive unit having at least one drive wheel for driving a transport container;
   providing cutouts in opposing steel joist lines;
   providing insertion plates adapted to fit in the cutouts;
   providing bearings operably associated with each drive unit, the bearings being carried by the insertion plates;
   providing a control system;
   activating by means of the control system each drive unit of the first lane in response to the approach of the transport container approaching on the first lane, and activating by means of the control system each drive unit of the second lane in response to the approach of the transport container approaching on the second lane; and
   disabling by means of the control system each drive unit of the first lane in response to the departure of the transport container departing on the first lane, and disabling by means of the control system each drive unit of the second lane in response to the departure of the transport container departing on the second lane.

9. The method according to claim 8, further comprising:
   providing an electrical power system for powering the drive units.

10. The method according to claim 8, further comprising:
    operably associating a current collector with at least one of the containers;
    transmitting electrical power from the electrical power system to the at least one container via the current collector.

* * * * *